United States Patent
Hofer et al.

(10) Patent No.: US 11,588,724 B2
(45) Date of Patent: Feb. 21, 2023

(54) SYSTEM AND METHOD FOR FIREWALL PROTECTION OF DYNAMICALLY INTRODUCED ROUTES

(71) Applicant: Barracuda Networks, Inc., Campbell, CA (US)

(72) Inventors: Hannes Hofer, Innsbruck (AT); Leonhard Hoeckner, Innsbruck (AT)

(73) Assignee: Barracuda Network, Inc., Campbell, CA (US)

( * ) Notice: Subject to any disclaimer, the term of this patent is extended or adjusted under 35 U.S.C. 154(b) by 86 days.

(21) Appl. No.: 17/392,888

(22) Filed: Aug. 3, 2021

(65) Prior Publication Data

US 2022/0286379 A1 Sep. 8, 2022

Related U.S. Application Data

(60) Provisional application No. 63/155,836, filed on Mar. 3, 2021.

(51) Int. Cl.
*H04L 12/751* (2013.01)
*H04L 45/02* (2022.01)
*H04L 9/40* (2022.01)

(52) U.S. Cl.
CPC ............ *H04L 45/08* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 7,031,321 B2 * | 4/2006 | Habetha | H04L 45/36 370/254 |
| 9,110,865 B2 * | 8/2015 | Dow | H04L 45/12 |
| 2002/0165981 A1 * | 11/2002 | Basturk | H04L 45/54 719/318 |
| 2015/0110002 A1 * | 4/2015 | Wilkinson | H04W 40/02 370/329 |
| 2015/0372924 A1 * | 12/2015 | Newton | H04L 47/2408 370/235 |
| 2019/0349357 A1 * | 11/2019 | Shukla | H04L 63/20 |
| 2020/0314065 A1 * | 10/2020 | Roy | H04L 63/0209 |
| 2022/0191173 A1 * | 6/2022 | Karpovsky | H04L 63/0236 |

* cited by examiner

*Primary Examiner* — Sanchit K Sarker

(57) ABSTRACT

A new approach is proposed to support firewall protection of dynamically introduced routes in an internal communication network. Under the proposed approach, all routes dynamically introduced into the internal communication network via a dynamic routing service are dynamically learned and tagged by a route collection engine. A dynamic network object is created, which is a software component configured to store a plurality of single IP addresses and/or IP address ranges of the dynamically learned routes in a dynamic routing network. A firewall engine of the internal communication network is configured to create one or more firewall rules referencing the dynamic network object and apply various security measures/policies to network data packets routed on the dynamically learned routes in the dynamic routing network based on IP address matching with the dynamic network object.

21 Claims, 4 Drawing Sheets

FIG. 3

SYSTEM AND METHOD FOR FIREWALL PROTECTION OF DYNAMICALLY INTRODUCED ROUTES

CROSS-REFERENCE TO RELATED APPLICATIONS

This application claims the benefit of U.S. Provisional Patent Application No. 63/155,836, filed Mar. 3, 2021, which is incorporated herein in its entirety by reference.

BACKGROUND

Today many organizations are using dynamic routing service, which is a process where a router can forward data in the form of a network packet to a given destination via a different/dynamically introduced route based on the current conditions of an internal communication network for communication among components/entities/users within an organization. Dynamic routing uses multiple dynamic routing protocols to organize the internal communication network in a dynamic fashion, wherein the dynamic routing protocols allow a router to share information about the internal communication network with other routers in order to select the best path to reach the destination. For non-limiting examples, the dynamic routing protocols include Open Shortest Path First (OSPF), Border Gateway Protocol (BGP), and Routing Information Protocol (RIP). Dynamic routing offers multiple advantages including but not limited to:

Dynamic failover upon network outages;
Easier configuration and integration in cloud setups;
Dynamic adjustment to network topology changes, etc.

Firewall rules applied by a firewall of the internal communication network specify security features/policies used to protect the routes in the internal communication network. Such security features/policies include but are not limited to Intrusion Prevention System (IPS), Advanced Thread Protection (ATP), SSL Interception (SSLInt) and more. Since dynamically introduced routes in the internal communication network are subject to change in a dynamic and unpredictable way, however, these firewall rules used to protect the internal communication network are not configurable for those dynamically introduced routes. This causes a security concern since the dynamically introduced routes are no longer under clear control of the system administrator and the security features of the firewall can no longer be set granularly for these dynamically introduced routes.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts an example of a set of firewall rules that refence a dynamic network object having a set of dynamically learned routes in a dynamic routing network and apply a set of security policies to the set of dynamically learned routes in accordance with some embodiments.

DETAILED DESCRIPTION OF EMBODIMENTS

Figure 1:
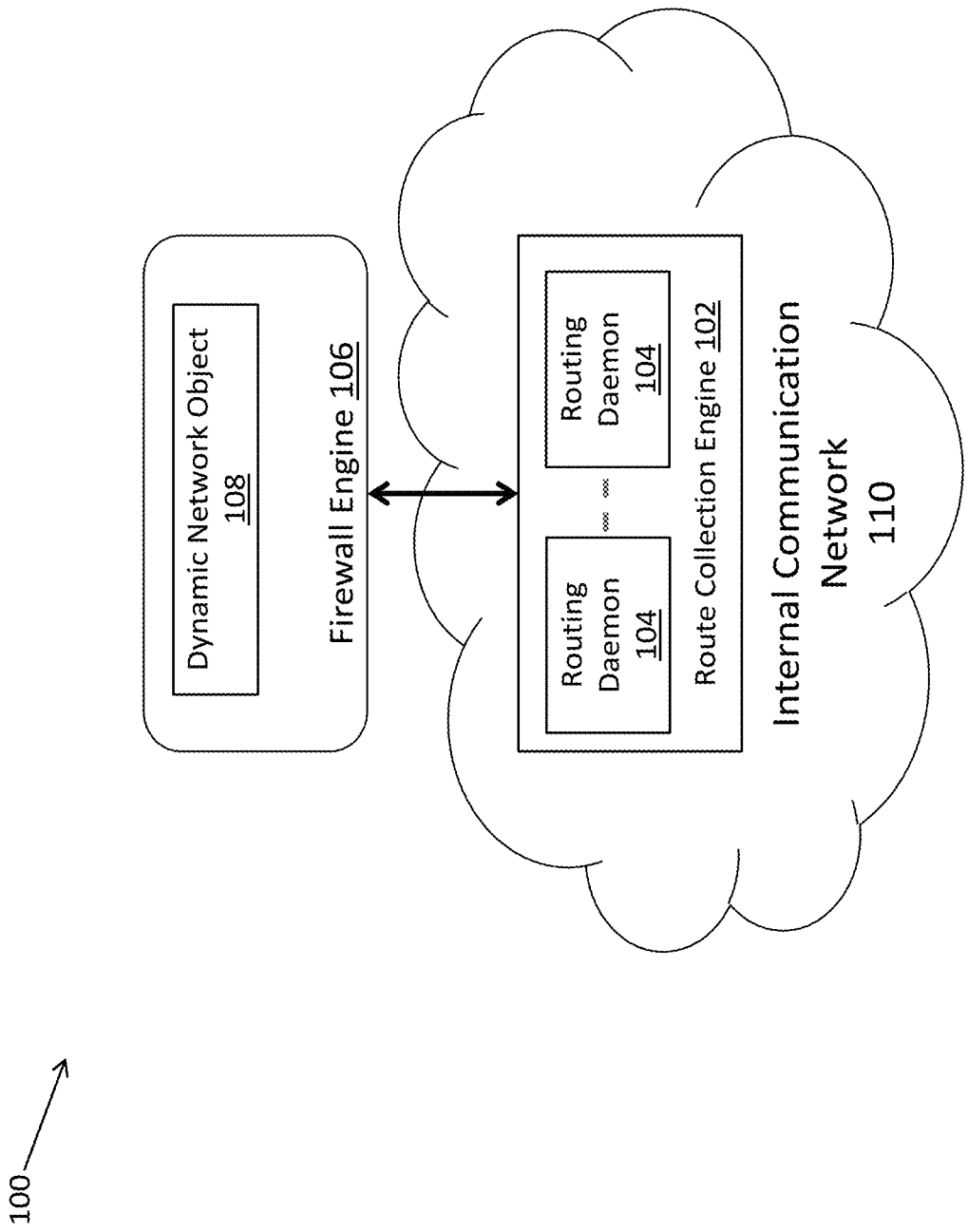
FIG. 1 depicts an example of a system diagram to support firewall protection of dynamically introduced routes in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support firewall protection of dynamically introduced routes in an internal communication network. Under the proposed approach, all routes dynamically introduced into the internal communication network via a dynamic routing service are dynamically learned and tagged by a route collection engine. A dynamic network object is created, which is a software component configured to store a plurality of single IP addresses and/or IP address ranges of the dynamically learned routes in a dynamic routing network. A firewall engine of the internal communication network is configured to create one or more firewall rules referencing the dynamic network object and apply various security measures/policies to the network data packets routed on the dynamically learned routes based on IP address matching with the dynamic network object.

Under the proposed approach, new firewall rules can be created for routes dynamically introduced and learned in a dynamic routing network under all kinds of dynamic routing protocols such as OSPF, BGP, RIP, etc. With the newly created firewall rules, the firewall engine is able to enforce various security mechanisms through security policies on network packets that are being routed along those dynamically introduced routes in the dynamic routing network. As a result, a system administrator now can have full control of the dynamically introduced routes in the internal communication network regardless of how the network packets are being routed.

FIG. 1 depicts an example of a system diagram 100 to support firewall protection of dynamically introduced routes. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a route collection engine 102, which further comprises one or more route daemons 104s, a firewall engine 106, and a dynamic network object 108. These components in the system 100 each run on one or more computing units/appliances/devices/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each of the route collection engine 102, the firewall engine 106, and the dynamic network object 108 is associated with an internal communication network 110, which can be but is not limited to, Internet, intranet, wide area network (WAN), local area network (LAN), wireless network, Bluetooth, WiFi, and mobile communication network for internal communications among entities, components, and users of an organization. The physical connections of the internal communication network 110 and the communication protocols are well known to those of skilled in the art.

In the example of FIG. 1, the route collection engine 102 is configured to monitor network traffic in the internal communication network 110 and to identify/learn and collect any route dynamically introduced into the internal communication network 110. Here, a route is dynamically introduced into the internal communication network 110 when a network packet is being routed between two points (e.g., source and destination) in the internal communication network 110 under one of the dynamic routing protocols based on the current routing conditions (e.g., congestions) of the internal communication network 110. In some embodiments, the two points of the dynamically introduced route can be represented by their respective network/IP addresses and the dynamically introduced route can be represented by one or more or a range of IP addresses. In some embodiments, the route collection engine 102 is located externally to the internal communication network 110 while being able to access routing information of packets in the internal communication network 110. In some embodiments, the route collection engine 102 further includes one or more route daemons 104s deployed at the internal communication network 110, wherein each route daemon 104 is a software component running as a background process and is configured to collect routing information of the network packets while the network packets are being dynamically routed in the internal communication network 110. In some embodiments, the one or more route daemons 104s are configured to learn about the dynamically introduced routes via the dynamic routing protocol used to route the network packets in the internal communication network 110. Here, the dynamic routing protocol can be but is not limited to one of OSPF, BGP, and RIP.

Once a dynamically introduced route is learned, the route collection engine 102 is configured to determine if the dynamically learned route results in changes (e.g., a new addition) to a dynamic routing network comprising a set of the dynamically introduced routes that have been utilized so far for dynamic routing of network packets in the internal communication network 110. If it is determined that the dynamic routing network has changed, e.g., because the dynamically learned route has not been utilized in the internal communication network 110 before, the route collection engine 102 is configured to tag the dynamically learned route and inform the firewall engine 106 accordingly. In some embodiments, the route daemons 104s of the route collection engine 102 are configured to periodically synchronize the current status of the dynamic routing network with the firewall engine 106 via one or more inter process communication techniques in order to get the information about the dynamically learned routes to the firewall engine 106.

Figure 2:
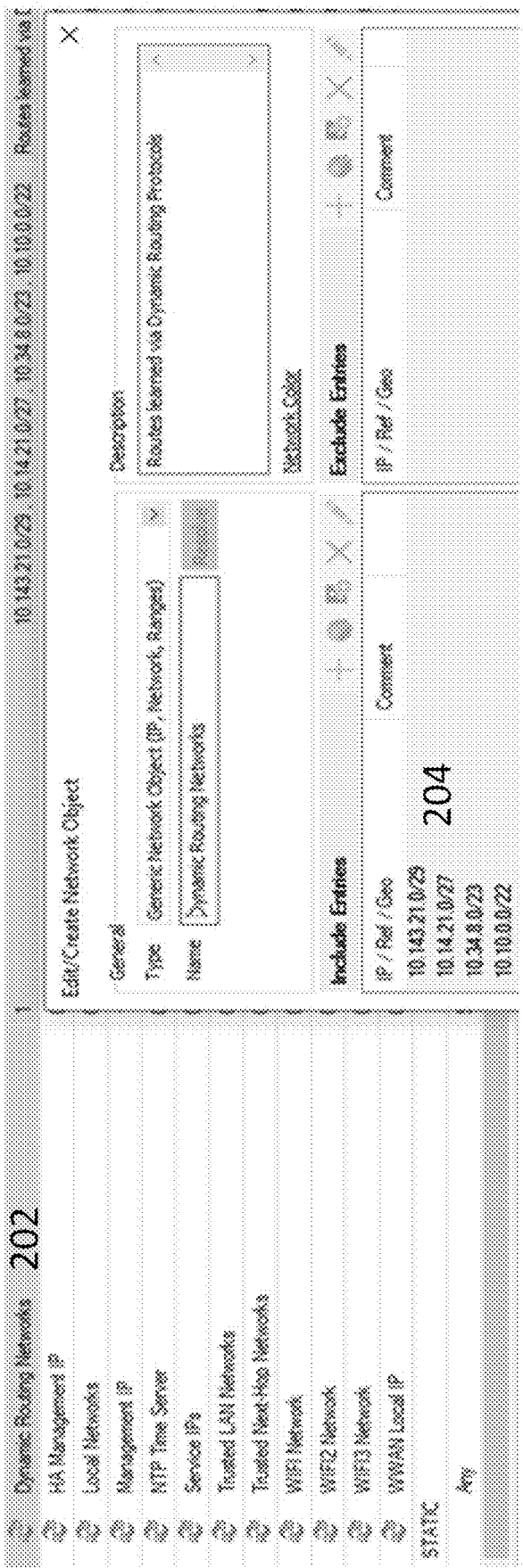
FIG. 2 depicts an example of a dynamic network object that maintains a set of entries of IP addresses for a set of dynamically introduced routes in a dynamic routing network in accordance with some embodiments.

In the example of FIG. 1, the firewall engine 106 is configured to protect various components and users in the internal communication network 110 by applying security policies, measures and/or mechanisms to routes in the internal communication network 110 according to a set of firewall rules. In some embodiments, the firewall engine 106 is configured to store the dynamically learned route tagged by the route collection engine 102 in the dynamic network object 108 for firewall rule evaluation. Here, the dynamic network object 108 is a software component (e.g., as an abstraction layer object) configured to maintain a plurality of dynamically introduced routes learned by the route collection engine 102. In some embodiments, the dynamic network object 108 is configured to maintain each of the plurality of dynamically introduced routes either as a single IP address (e.g., IP address of either the starting or ending point of the route) or a range of IP addresses (e.g., between the starting or ending point of the route). Whenever the status, e.g., the routes in the dynamic routing network, changes and a new dynamically introduced route is learned by the route collection engine 102, the firewall engine 106 is configured to update/edit the dynamic network object 108 to include the new dynamically learned route. FIG. 2 depicts an example of the dynamic network object 108 that maintains a set of entries of IP addresses 204 for a set of dynamically introduced routes in a dynamic routing network 202. In some embodiments, multiple dynamic network objects 108s are created and utilized by the firewall engine 106 to update the firewall rules, wherein each of the more than one dynamic network objects 108s maintains only the dynamic routes learned via a specific type of dynamic routing protocol (e.g., BGP). These routing protocol specific dynamic network objects 108s allow a more granular application of the firewall rules based on different types of the dynamically learned routes.

Figure 3:
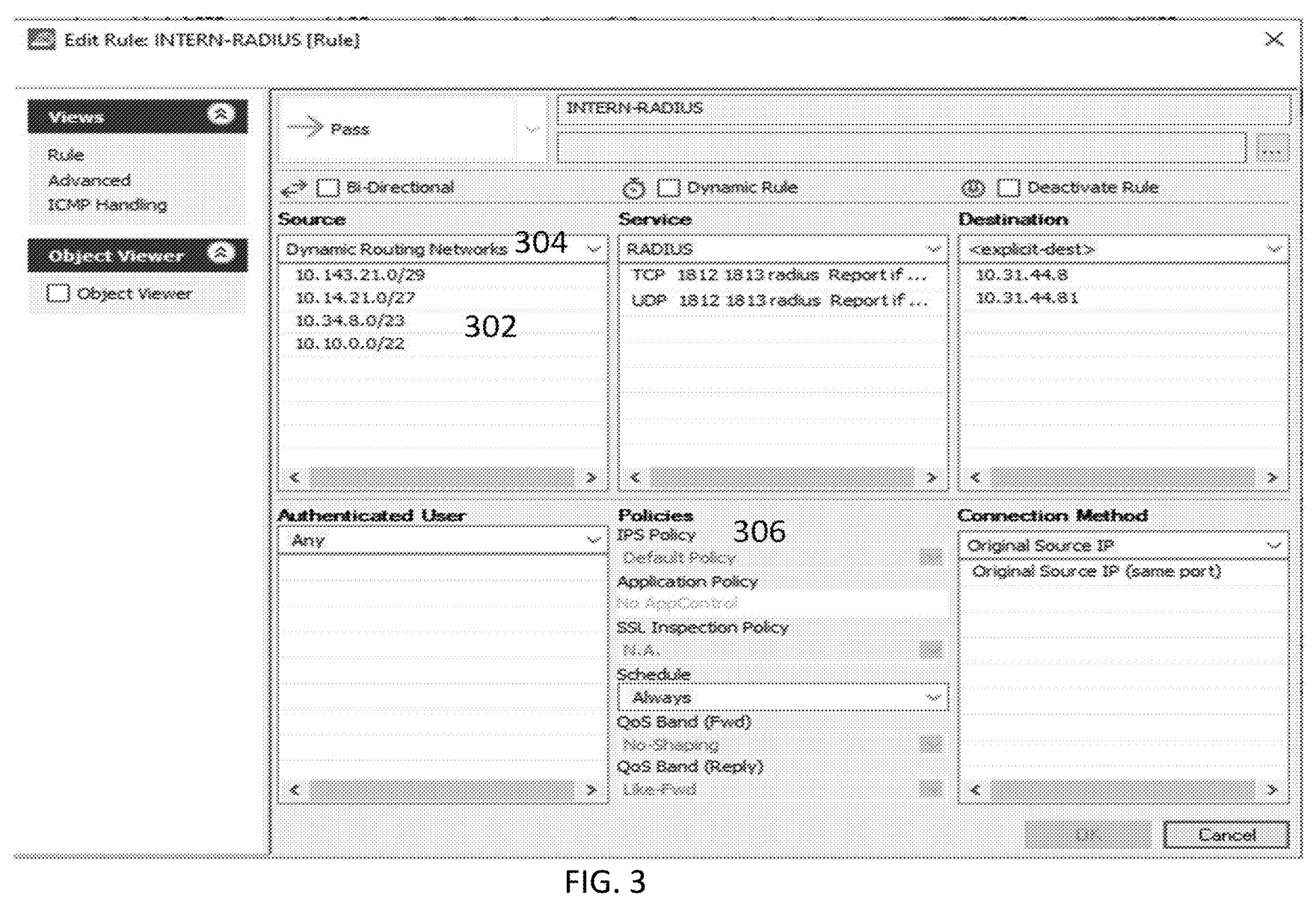

Once the dynamic network object 108 has been updated with the new dynamically learned route, the firewall engine 106 is configured to process the dynamic network object 108 having the new dynamically learned route and to re-evaluate all the routing sessions according to the firewall rules that enforce security measures/policies on the internal communication network 110. In some embodiments, the firewall engine 106 is configured to apply a set of security policies according to one or more firewall rules to inspect network packets routed on the new dynamically learned route. Here, the set of security policies include but are not limited to one or more of IPS policy, ATP policy, application policy, SSL inspection policy, etc. In some embodiments, the dynamic network object 108 is referenced in the one or more firewall rules to be applied to the dynamically learned routes maintained in the dynamic network object 108. In some embodiments, the firewall rules each associate one or more of the set of security policies with certain IP addresses and/or IP address ranges. The firewall engine 106 is configured to apply the set of security policies to each of the dynamically learned routes in the dynamic network object 108 by matching the IP address and/or IP address ranges of the dynamically learned routes in the dynamic network object with the IP addresses and/or ranges of the security policies in the firewall rules. By applying/morphing these firewall rules to the dynamically learned routes as maintained in the dynamic network object 108, the system administrator can have control over the dynamic routing network and the dynamic routing network is protected from cyber intrusions and attacks as the rest of the routes in the internal communication network 110. FIG. 3 depicts an example of a set of firewall rules that refence a dynamic network object having a set of dynamically learned routes 302s in a dynamic routing network 304 and apply a set of security policies 306 to the set of dynamically learned routes 302s.

Figure 4:
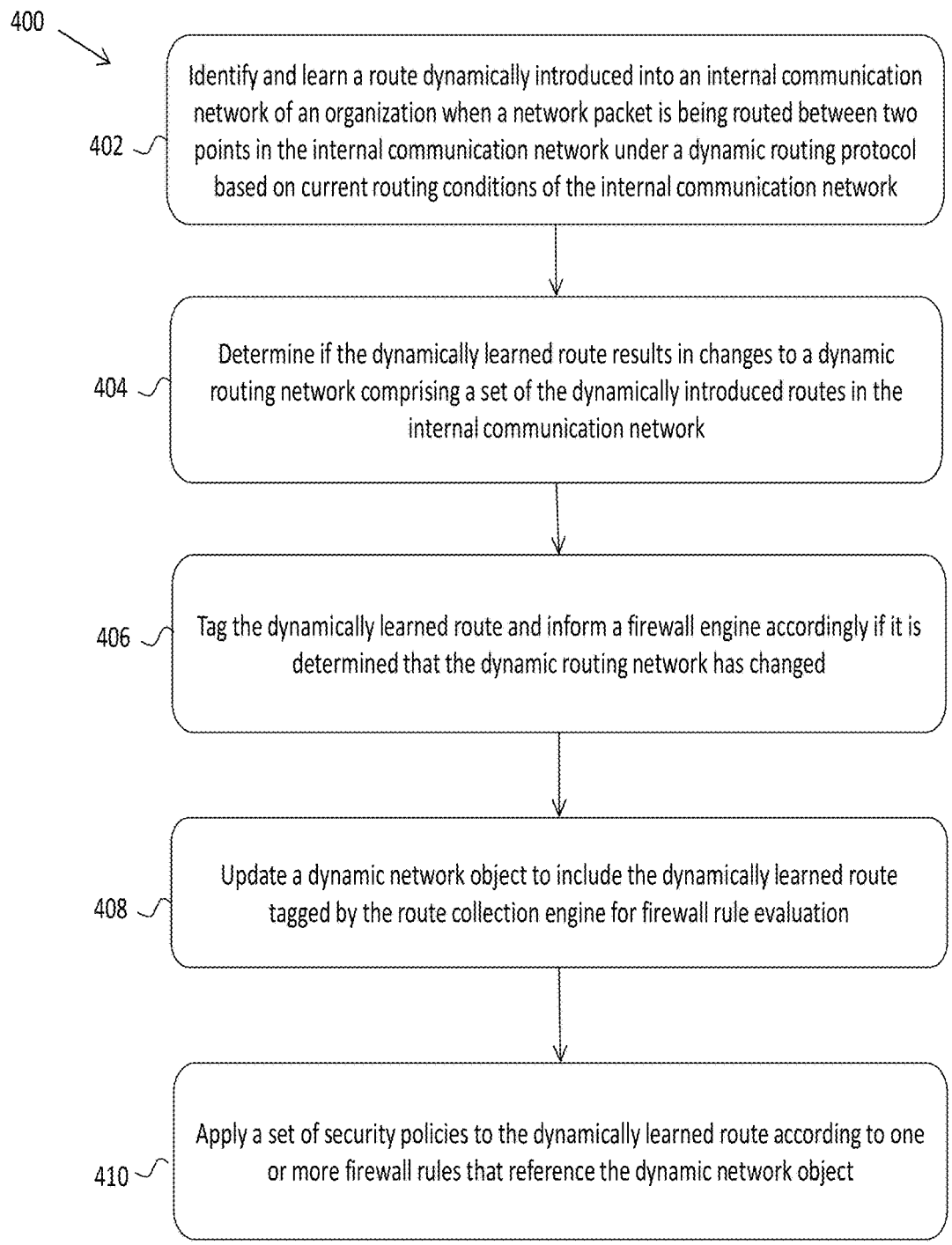
FIG. 4 depicts a flowchart of an example of a process to support firewall protection of dynamically introduced routes in accordance with some embodiments.

FIG. 4 depicts a flowchart 400 of an example of a process to support firewall protection of dynamically introduced routes. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a route dynamically introduced into an internal communication network of an organization is identified and learned when a network packet is being routed between two points in the internal communication network under a dynamic routing protocol based on current routing conditions of the internal communication network. The flowchart 400 continues to block 404, where it is determined whether the dynamically learned route results in changes to a dynamic routing network comprising a set of the dynamically introduced routes in the internal communication network. The flowchart 400 continues to block 406, where the dynamically learned route is tagged and a firewall engine is informed accordingly if it is determined that the dynamic routing network has changed. The flowchart 400 continues to block 408, where a dynamic network object is updated to include the dynamically learned route tagged by the route collection engine for firewall rule evaluation. The flowchart 400 ends at block 410, where a set of security policies are applied to the dynamically learned route according to one or more firewall rules that reference the dynamic network object.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system, comprising:
a computing device comprising a route collection engine to identify and learn a route dynamically introduced, represented by one or more IP addresses, into an internal communication network of an organization when a network packet is being routed between two points in the internal communication network under a dynamic routing protocol based on current routing conditions of the internal communication network;
determine if the dynamically learned route results in changes to a dynamic routing network comprising a set of the dynamically introduced routes in the internal communication network;
tag the dynamically learned route and inform a firewall engine accordingly if it is determined that the dynamic routing network has changed;
a computing device comprising said firewall engine to update a dynamic network object to include the dynamically learned route tagged by the route collection engine for firewall rule evaluation;
apply a set of security policies associated with certain IP addresses and/or IP address ranges to the dynamically learned route according to one or more firewall rules that reference the dynamic network object to determine a match between the one or more IP addresses of the dynamically learned routes and IP addresses and/or IP address ranges of the set of security policies,
wherein the dynamically introduced routes are protected in an internal communication.

2. The system of claim 1, wherein:
the dynamically introduced route is represented by a range of IP addresses.

3. The system of claim 1, wherein:
the route collection engine is located externally to the internal communication network while being able to access routing information of the network packet in the internal communication network.

4. The system of claim 3, wherein:
the route collection engine includes one or more route daemons deployed in the internal communication network, wherein each route daemon is a software component running as a background process and is configured to collect the routing information of the network packet while the network packet is being dynamically routed in the internal communication network.

5. The system of claim 4, wherein:
the one or more route daemons are configured to learn the dynamically introduced routes via the dynamic routing protocol used to route the network packet in the internal communication network.

6. The system of claim 4, wherein:
the one or more route daemons are configured to periodically synchronize current status of the dynamic routing network via one or more inter process communication techniques.

7. The system of claim 1, wherein:
the dynamic network object is a software component configured to maintain a plurality of dynamically learned routes in the dynamic routing network.

8. The system of claim 7, wherein:
the dynamic network object is configured to maintain each of the plurality of dynamically introduced routes either as a single IP address or a range of IP addresses.

9. The system of claim 1, wherein:
more than one dynamic network objects are created and utilized, wherein each of the more than one dynamic network object maintains only the dynamic routes learned via a specific type of dynamic routing protocol.

10. The system of claim 1, wherein:
the set of security policies include one or more of Intrusion Prevention System (IPS) policy, Advanced Thread Protection (ATP) policy, application policy, and SSL inspection policy.

11. The system of claim 1, wherein:
the one or more firewall rules each associates one or more of the set of security policies with certain IP addresses and/or IP address ranges.

12. The system of claim 11, wherein:
the firewall engine is applies the set of security policies to the dynamic network object to determine the match.

13. A computer-implemented method, comprising:
identifying and learning a route dynamically introduced, represented by one or more IP addresses, into an internal communication network of an organization when a network packet is being routed between two points in the internal communication network under a dynamic routing protocol based on current routing conditions of the internal communication network;
determining if the dynamically learned route results in changes to a dynamic routing network comprising a set of the dynamically introduced routes in the internal communication network;
tagging the dynamically learned route if it is determined that the dynamic routing network has changed;
updating a dynamic network object to include the tagged dynamically learned route for firewall rule evaluation;
applying a set of security policies associated with certain IP addresses and/or IP address ranges to the dynamically learned route according to one or more firewall rules that reference the dynamic network object to determine a match between the one or more IP addresses of the dynamically learned routes and IP addresses and/or IP address ranges of the set of security policies,
wherein the dynamically introduced routes are protected in an internal communication.

14. The method of claim 13, further comprising:
representing the dynamically introduced route by a range of IP addresses.

15. The method of claim 13, further comprising:
deploying one or more route daemons in the internal communication network, wherein each route daemon is a software component running as a background process and is configured to collect the routing information of the network packet while the network packet is being dynamically routed in the internal communication network.

16. The method of claim 13, further comprising:
learning the dynamically introduced routes via the dynamic routing protocol used to route the network packet in the internal communication network.

17. The method of claim 13, further comprising:
periodically synchronizing current status of the dynamic routing network via one or more inter process communication techniques.

18. The method of claim 13, further comprising:
maintaining a plurality of dynamically learned routes in the dynamic routing network, wherein each of the plurality of dynamically introduced routes is represented either as a single IP address or a range of IP addresses.

19. The method of claim 13, further comprising:
creating and utilizing more than one dynamic network object, wherein each of the more than one dynamic network object maintains only the dynamic routes learned via a specific type of dynamic routing protocol.

20. The method of claim 13, further comprising:
associating one or more of the set of security policies in each of the one or more firewall rules with the certain IP addresses and/or IP address ranges.

21. The method of claim 20, further comprising:
applying the set of security policies to the dynamic network object to determine the match.

* * * * *